United States Patent [19]
Ogasawara

[11] Patent Number: 6,125,088
[45] Date of Patent: Sep. 26, 2000

[54] ABERRATION CORRECTING APPARATUS AND INFORMATION RECORDING MEDIUM PLAY-BACK APPARATUS

[75] Inventor: Masakazu Ogasawara, Saitama, Japan

[73] Assignee: Pioneer Electronic Corporation, Tokyo, Japan

[21] Appl. No.: 09/035,130

[22] Filed: Mar. 5, 1998

[30] Foreign Application Priority Data

Mar. 5, 1997 [JP] Japan .................................. 9-067348

[51] Int. Cl.[7] ........................................................ G11B 7/09
[52] U.S. Cl. ........................................ 369/44.32; 369/112
[58] Field of Search ................................ 369/54, 44.32, 369/58, 44.23, 112

[56] References Cited

U.S. PATENT DOCUMENTS

| | | | |
|---|---|---|---|
| 5,859,818 | 1/1999 | Tateishi et al. | 369/44.32 |
| 5,914,923 | 6/1999 | Araki et al. | 369/44.32 |
| 5,936,923 | 8/1999 | Ootaki et al. | 369/54 |

FOREIGN PATENT DOCUMENTS 9-128785  5/1997  Japan .

*Primary Examiner*—Thang V. Tran
*Attorney, Agent, or Firm*—Morgan, Lewis & Bockius LLP

[57] ABSTRACT

An aberration correcting apparatus corrects an aberration of a beam emitted from a light source and focused on an information recording medium by an optical system. The aberration correcting apparatus includes a wave front aberration correcting unit aligned in an optical path between the light source and the information recording medium for correcting a wave front aberration of an incident beam by changing a refractive index corresponding to an applied voltage. A detector assembly detects a tilt-angle of the information recording medium, and a controller controls the wave front aberration correcting unit corresponding on an output of the detector assembly.

24 Claims, 5 Drawing Sheets

ABERRATION CORRECTING APPARATUS AND INFORMATION RECORDING MEDIUM PLAY-BACK APPARATUS

This application claims the benefit of Japanese Application No. 9-67348, filed in Japan on Mar. 5, 1997 which is hereby incorporated by reference.

BACKGROUND OF THE INVENTION

1. Field of the Invention

The present invention relates to an aberration correcting apparatus for an information recording medium play-back apparatus. The information recording medium is generally an optical disc or similar medium.

2. Description of the Prior Art

In recent years the digital video (or versatile) disc (DVD) has attracted much attention as a large capacity digital information storage medium. Digital information such as animation, sound, computer information, or the like can be recorded on an optical disc having the same diameter, 12 cm, as a compact disk (CD) but with a recording density 6–8 times larger than the CD.

The DVD employs a smaller track pitch than the CD. The smaller track pitch increases the recording density and when coupled with a reduction in pit size a high density recording of approximately 5 G-bytes per side of the DVD has been achieved.

To read the high density recorded information of the DVD, a spot diameter of a laser beam employed to read the optical disk, is reduced to a size less than the laser beam spot diameter used for the CD. To produce a laser beam spot with a smaller diameter for the DVD, the wavelength of the laser beam source is set to 650 nm, which is shorter than the 780 nm laser beam wavelength used for play-back of the CD. The numerical aperture of an objective lens of the DVD play-back apparatus is set to 0.6, which is larger than the 0.45 aperture used in the play-back of the CD.

Central to the operation of the high-density recording disc is the concept of a tilt-angle. A tilt-angle is defined as the angle of deviation from a perpendicular surface of the optical disc with respect to the optical axis of the optical pickup. The tilt-angle causes a wave front aberration, mainly coma aberration, resulting in a deterioration of the S/N ratio of the reproduce signal due to the aberration (tilt-angle). The tilt-angle may result from one of several sources, such as warping of the surface of the optical disc or a tilting of the optical apparatus. As a result of the increase in the numerical aperture, the amount of the tilt-angle allowed is decreased.

The laser beam spot diameter is proportional to the wavelength of the laser beam source and inversely proportional to the numerical aperture of the objective lens. Therefore, by increasing the numerical aperture without changing the wavelength of the laser beam source, the recording density can be increased. As a result of increasing the numerical aperture, the angle that the surface of the optical disc is allowed to deviate from the perpendicular, with respect to the optical axis of an optical pickup, is reduced.

The optical discs, such as the DVD and CD, are slightly warped due to their own weight or to manufacturing conditions. However, if an optical disc has a large warped surface its tilt-angle may be large and exceed a tolerable level so that the S/N ratio deteriorates and, therefore, an excellent reproduction signal cannot be obtained.

SUMMARY OF THE INVENTION

Accordingly, the present invention is directed to an aberration correcting apparatus and information recording medium play-back apparatus that is capable of correcting wave front aberration caused by the tilt-angle of an information recording medium.

According to one aspect of the present invention, there is provided an aberration correcting apparatus for correcting an aberration of a laser beam that is emitted from a light source and focused on an information recording medium by an optical system, the aberration correcting apparatus includes a detecting means for detecting a tilt-angle of the information recording medium, a wave front aberration correcting means aligned in an optical path between the light source and the information recording medium for correcting wave front aberration of an incident beam by changing a refractive index corresponding to an applied voltage, and a control means for controlling the wave front aberration correcting means based on an output of the detecting means.

In another aspect of the present invention, there is provided an aberration correcting apparatus for correcting an aberration of a laser beam that is emitted from a light source and focused on an information recording medium by an optical system, the aberration correcting apparatus includes a liquid crystal element aligned in an optical path between the light source and the information recording medium for correcting wave front aberration of incident laser beam, a first detecting means for detecting a tilt-angle of the information recording medium in a radial direction, a second detecting means for detecting a tilt-angle of the information recording medium in a tangential direction; and a liquid crystal element control means for outputting a first control voltage for correcting an aberration due to the tilt-angle in the radial direction and a second control voltage for correcting an aberration due to the tilt-angle in the tangential direction according to outputs of the first and second detecting means, wherein the liquid crystal element includes a first electrode for applying the first control voltage and a second electrode for applying the second control voltage.

According to the present invention, wave front aberration caused by the tilt-angle of an information recording medium can be corrected by a simple control.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
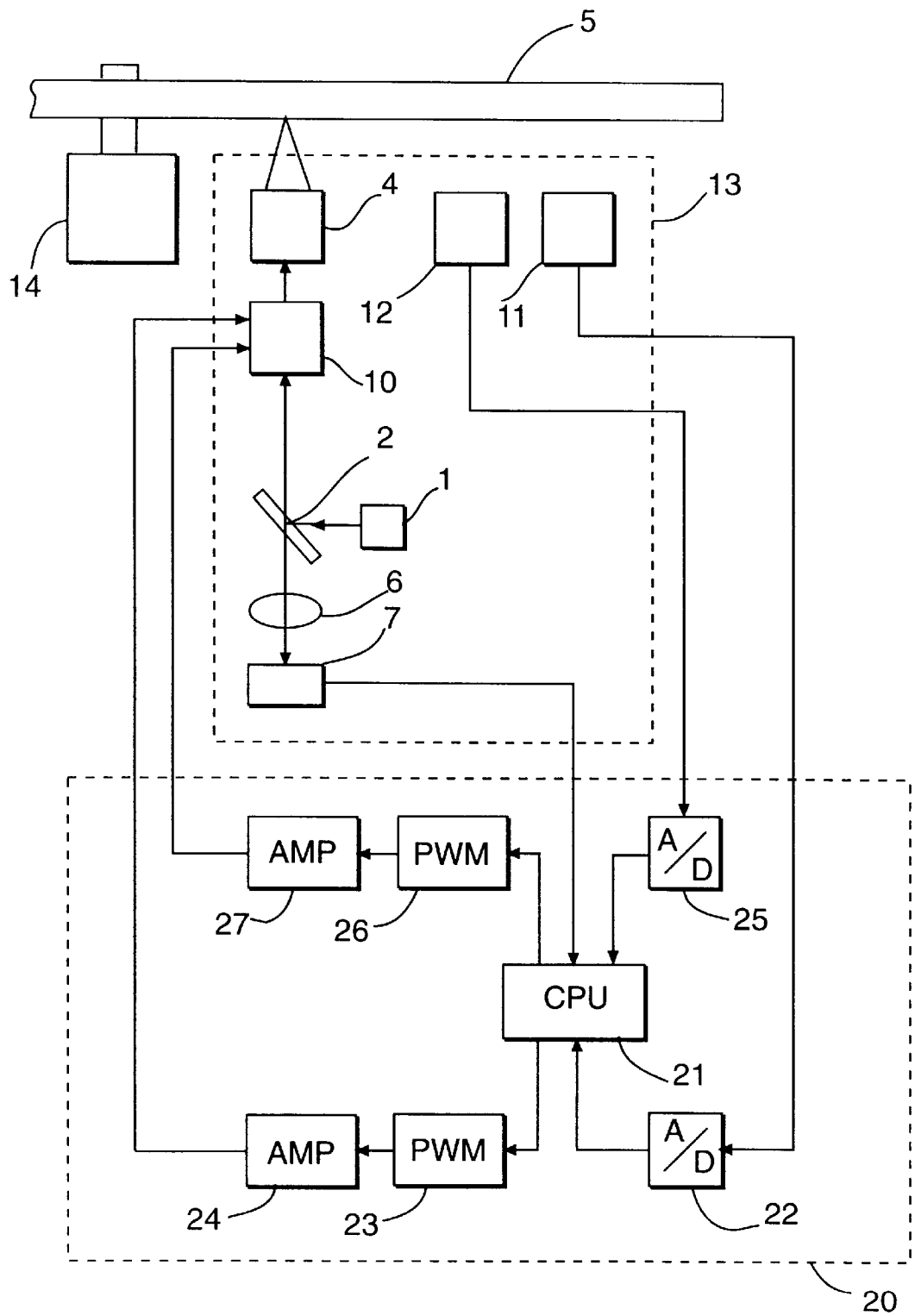
FIG. 1 is a schematic diagram of an information recording medium play-back apparatus using an aberration correcting apparatus of the present invention.

FIG. 1 is a block diagram of an information recording medium play-back apparatus employing an aberration correcting apparatus according to a first embodiment of the present invention.

Optical disc 5, which is an information recording medium, is driven by a spindle motor 14 at a predetermined speed so that the recording information is reproduced by an optical pickup 13. A laser beam is irradiated from a semiconductor laser 1, which is the light source utilized by the optical pickup 13, is reflected by a half mirror 2, and is directed to pass through a liquid crystal element 10 so that the beam is focused by an objective lens 4 forming a focal point on the information recording surface of the optical disc 5.

The laser beam reflected from the information recording surface of the optical disc 5 is once again passed through the objective lens 4, liquid crystal element 10, and the half mirror 2 and passes through condensing lens 6, which focuses the laser beam on a light receiver 7. An output from the light receiver 7 is outputted to CPU 21.

The optical pickup 13 also includes a radial tilt sensor 11 for detecting a tilt-angle (the deviation angle of the optical disc surface from the perpendicular relative to the optical axis of the optical pickup) in a radial direction caused by warping or tilting of the optical disc 5 and a tangential tilt sensor 12 for detecting the tilt-angle in a tangential direction. The liquid crystal element 10 is a wave front aberration correcting means for correcting a wave front aberration that is caused at a focal point of the optical disc 5 due to the tilt-angles in the radial and tangential directions.

The radial tilt sensor 11 and tangential tilt sensor 12, which share a substantially identical structure, are optical sensors that include a light emitting portion and two light receiving portions. The radial tilt sensor 11 is positioned to detect a tilt-angle in the radial direction of the optical disc 5 and the tangential tilt sensor 12 is positioned to detect a tilt-angle in the tangential direction of optical disc 5.

The output of the radial tilt sensor 11 is outputted to a liquid crystal element driving circuit 20. The liquid crystal element driving circuit 20 includes an A/D converter 22, a pulse width modulation (PWM) circuit 23 and an amplifier 24, which are for the signal outputted from the radial tilt sensor 11, an A/D converter 25, a pulse width modulation (PWM) circuit 26 and an amplifier 27, which are for the signal outputted from the tangential tilt sensor 12, and a CPU 21.

The output of the radial tilt sensor 11 is inputted into the A/D converter 22 and converted from analog-data to digital-data and outputted to the CPU 21. The CPU 21 determines an aberration correction amount (the phase difference to be imparted to a laser beam that passes through the liquid crystal element 10 so as to cancel the wave front aberration caused by the tiltangle in the radial direction) in the radial direction for each divided portion (which will be described later) of the liquid crystal element 10 corresponding to an output (digital-data supplied by the A/D converter 22) of the radial tilt sensor 11. The CPU 21 calculates an aberration correction amount corresponding to the output of the radial tilt sensor 11 by using data relating to aberration correction amounts stored in a ROM or similar memory device (not shown). The CPU 21 then outputs a signal corresponding to the aberration correction amount to the PWM circuit 23.

The PWM circuit 23 converts an aberration correction amount, which has been calculated by the CPU 21 based on digital data of the radial tilt sensor 11, to a pulse width corresponding to a magnitude thereof. The pulse signal converted by the PWM circuit 23 passes through a low-pass filter (not shown) and is converted to analog-data and then is outputted to an amplifier 24. The amplifier 24 amplifies the pulse signal to a desired magnitude and outputs the signal to the liquid crystal element 10 as a control voltage for the radial direction. The control voltage drives the liquid crystal element 10 to adjust a refractive index of the liquid crystal and provide the laser beam passing through the liquid crystal element 10 with a phase difference and, therefore, wave front aberration in the radial direction can be corrected.

The output of the tangential tilt sensor 12, for detecting a tilt-angle in the tangential direction of the optical disc 5, is also outputted to the liquid crystal element driving circuit 20. As in the radial tilt sensor 11, the output of the tangential tilt sensor 12 is outputted to the CPU 21 through the A/D converter 25. The CPU 21 determines an aberration correction amount (phase difference to be imparted to beam passing through the liquid crystal element 10 to cancel the wave front aberration that is caused by the tilt-angle in the tangential direction) in the tangential direction, corresponding to the output of the tangential tilt sensor 12. The signal corresponding to the aberration correction amount is outputted to the PWM circuit 26 and amplifier 27 and is outputted to the liquid crystal element 10 as a control voltage for the tangential direction. The control voltage drives the liquid crystal to adjust the refractive index of the liquid crystal and provides the laser beam passing through the liquid crystal element 10 with a phase difference. Therefore, wave front aberration in the tangential direction can be corrected.

Figure 2:
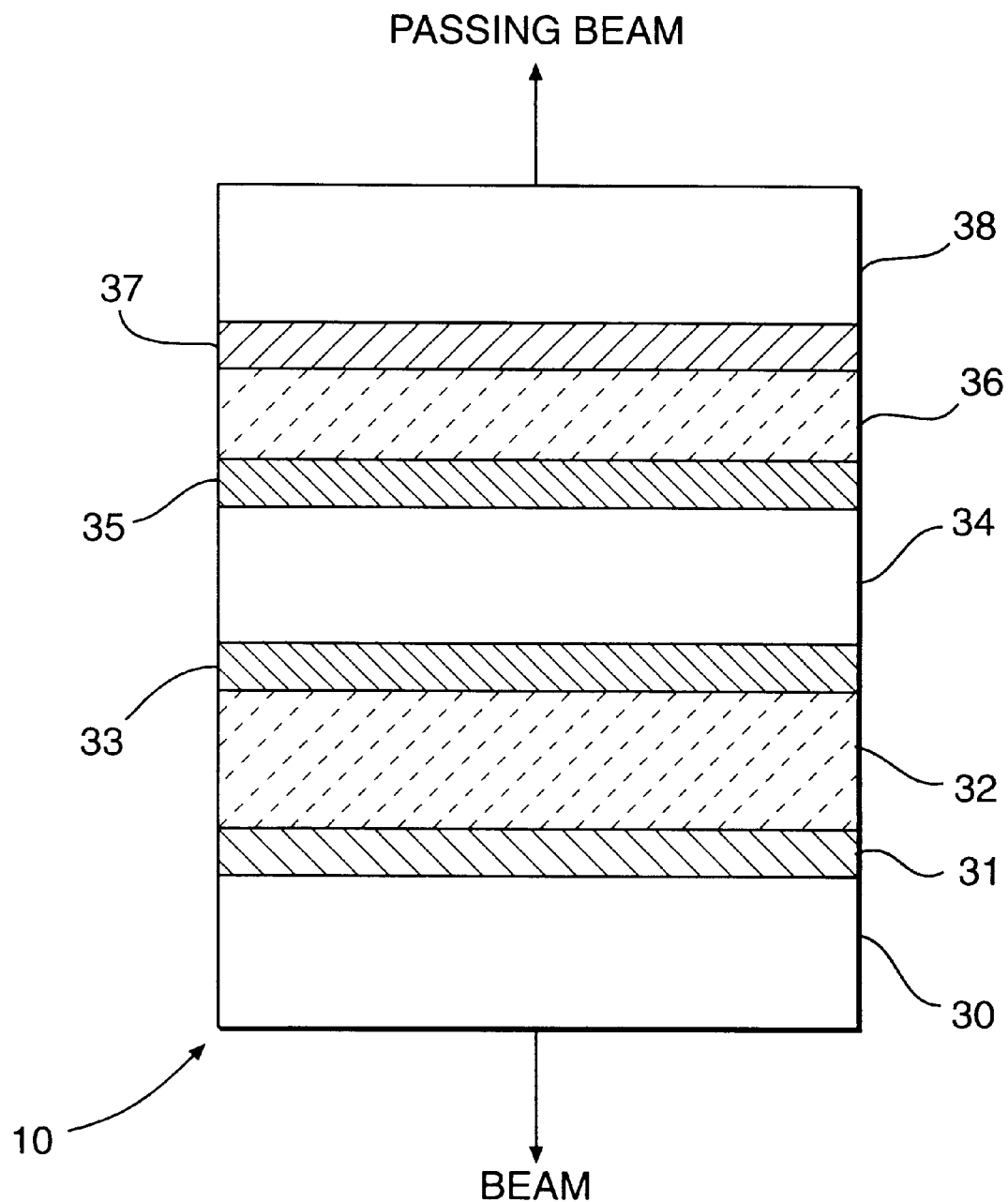
FIG. 2 is a diagram showing a cross-sectional view of the structure of a liquid crystal element according to a first embodiment of the present invention.

FIG. 2 is a diagram showing a cross-sectional view of the liquid crystal element 10 including a liquid crystal panel. The liquid crystal element 10 includes a first glass substrate 30, a radial direction transparent electrode 31, to which a control voltage is applied to correct the wave front aberration due to the tilt-angle in the radial direction of the optical disc 5, a liquid crystal layer 32 including nematic liquid crystal or similar material having double refraction, a transparent electrode 33 connected to ground level (i.e., 0V) pairing with the radial direction transparent electrode 31, a second glass substrate 34, a transparent electrode 35 connected to ground level (i.e., 0V) pairing with a tangential direction transparent electrode 37 (which will be described later), a liquid crystal layer 36 including nematic liquid crystal or similar material having double refraction, a tangential direction transparent electrode 37 to which a control voltage is applied to correct the wave front aberration due to the tilt-angle in the tangential direction of the optical disc 5, and a third glass substrate 38. The laser beam from the light source (the semiconductor laser beam 1 as shown in FIG. 1) is made incident upon the glass substrate 30 entering from the bottom of the crystal element 10, as shown by the arrow in FIG. 2, and passes upward through the glass substrate 38.

Figure 3A:
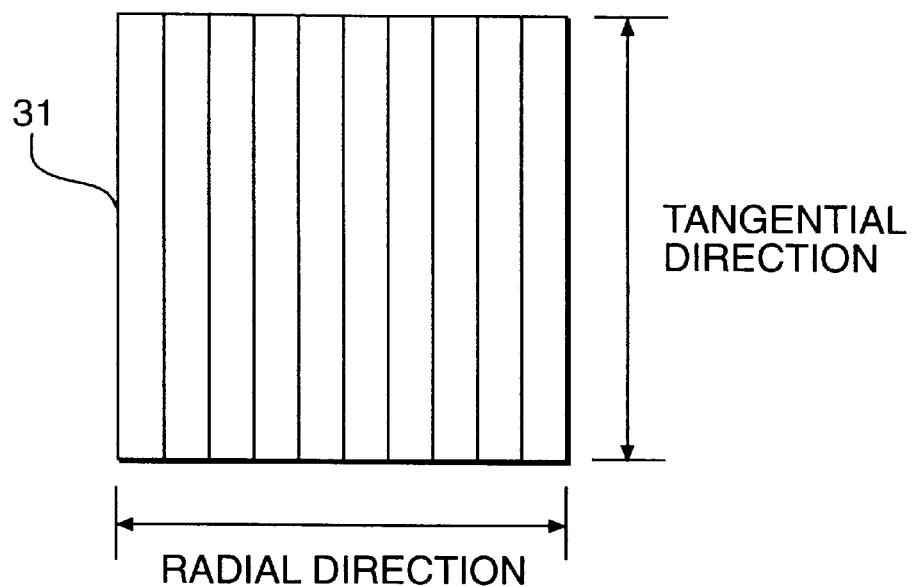
FIGS. 3A and 3B show vertical and horizontal division configurations, respectively, of a transparent electrode for use in the liquid crystal element of the present invention.

As shown in FIG. 3A, the radial direction transparent electrode 31 is divided in the radial direction to correct the wave front aberration in the radial direction of the optical disc 5. Each of the divided portions is driven by a control voltage corresponding to the output of the radial tilt sensor 11 supplied by the liquid crystal element driving circuit 20.

Thus, a different voltage is applied to each of the divided portions of the radial direction transparent electrode 31. The liquid crystal layer 32 adjusts the phase difference to be imparted to the passing laser beam by changing the refractive index of the liquid crystal corresponding to the voltage applied thereto and corrects the wave front aberration by the tilt-angle in the radial direction of the optical disc 5.

Figure 3B:
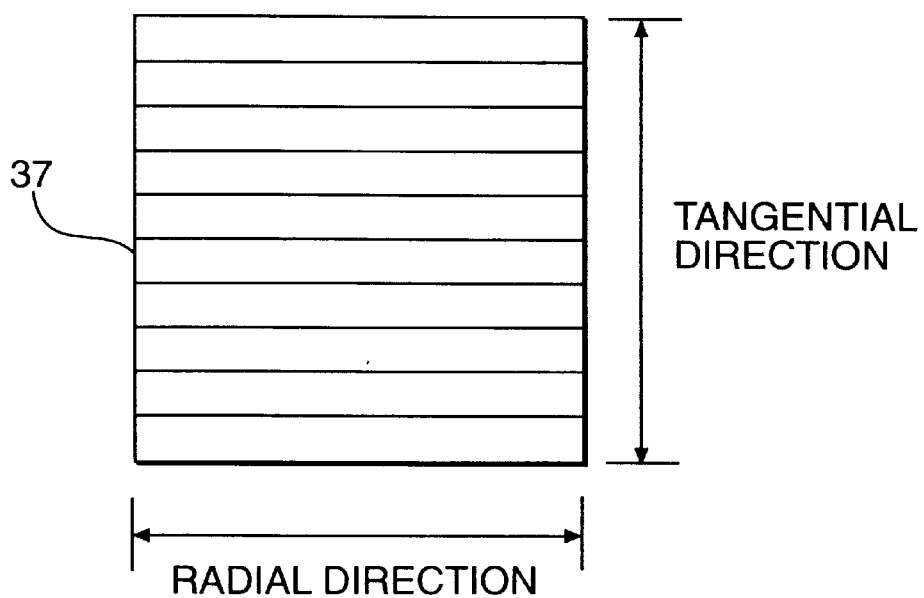

As shown in FIG. 3B, the tangential direction transparent electrode 37 is divided in the tangential direction so as to correct the wave front aberration in the tangential direction of the optical disc 5. Each of the divided portions is driven by a control voltage corresponding to an output of the tangential tilt sensor 12 outputted by the liquid crystal element driving circuit 20.

Thus, a different voltage is applied to each of the divided portions of the tangential direction transparent electrode 37. The liquid crystal layer 36 adjusts the phase difference to be imparted to the passing laser beam by changing the refractive index of the liquid crystal corresponding to voltage applied thereto and corrects the wave front aberration by the tilt-angle in the tangential direction of the optical disc 5.

As shown in FIGS. 3A and 3B, the radial direction transparent electrode 31 and the tangential direction transparent electrode 37 share substantially identical configurations and are orientated on the glass substrate 90° relative to each other. However, these are not the only configurations possible. It is permissible to divide the radial direction transparent electrode 31 and tangential direction transparent electrode 37 into different configurations and orientate the configurations at angles other than the 90° orientation described above.

The liquid crystal element 10 is constructed such that the upper liquid crystal layer of FIG. 2 imparts passing laser beams with a phase difference in the tangential direction and the lower liquid crystal layer imparts passing laser beams with a phase difference in the radial direction. However, the order in which the laser beam passes through the radial direction transparent electrode 31 and the tangential direction transparent electrode 37 is not critical. Also it is not critical to the operation of the present invention if both the tangential direction transparent electrode 37 and the radial direction transparent electrode 31 are both disposed before or after the glass substrate 34. The same results will be achieved.

Figure 4A:
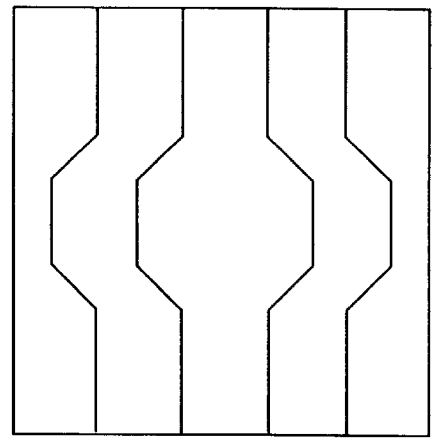
FIGS. 4A–4C show alternate division configurations of a transparent electrode for use in the liquid crystal element of the present invention.
Figure 4B:
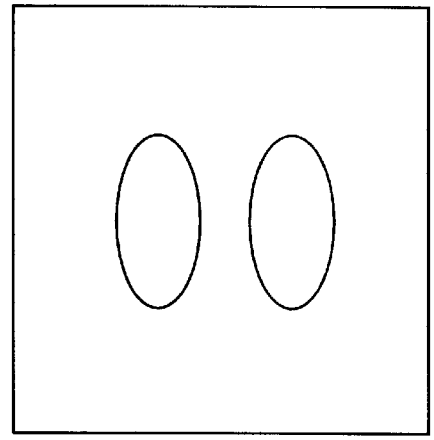
Figure 4C:
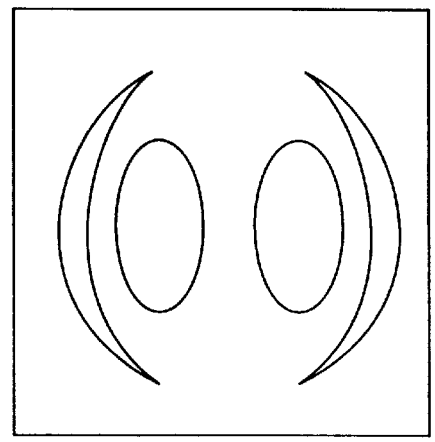

FIGS. 4A–4C show alternative examples of the dividing configuration applicable to the radial direction transparent electrode 31 or tangential direction transparent electrode 37. In particular, the partitioning configuration shown in FIG. 4C has a shape corresponding to the wave front aberration due to the tilt-angle of the optical disc 5. By controlling the respective divided areas in FIG. 4C corresponding to the output of the radial tilt sensor 11 or the tangential tilt sensor 12, the wave front aberration due to the tilt-angle can be substantially corrected.

The optical disc 5 generally has a higher degree of variation in the tilt-angle in the tangential direction than in the radial direction (that is, the output of the tangential tilt sensor 12 has a higher frequency than that of the radial tilt sensor 11). The thinner a liquid crystal layer the quicker the response speed becomes. Therefore, by making the thickness of the liquid crystal layer 36, which imparts to the passing laser beam a phase difference in the tangential direction, thinner than that of the liquid crystal layer 32, it is possible to provide the liquid crystal with a response characteristic suitable for the frequency of the output of the tangential tilt sensor 12.

According to the present embodiment, the liquid crystal layer 32 is 5 µm thick and the liquid crystal layer 36 is 3 µm thick. As the liquid crystal layer is thinned, the maximum phase difference that can be imparted decreases. However, the tilt-angle in the tangential direction is generally inclined to be smaller than the tilt-angle in the radial direction. Therefore, the phase difference to be imparted to the laser beam in the tangential direction is smaller than the phase difference in the radial direction, and there is no problem.

Furthermore, in the present embodiment, the liquid crystal element is so constructed that the wave front aberrations by the tilt-angles in the radial direction and tangential direction can be corrected by a single liquid crystal element.

Additionally, in the present embodiment, the liquid crystal element for the radial direction and that for the tangential direction are integrated. However, as shown in FIG. 5, it is permissible to provide a first liquid crystal element for correcting wave front aberration in the radial direction and a second liquid crystal element for correcting wave front aberration in the tangential direction separately.

Figure 5:
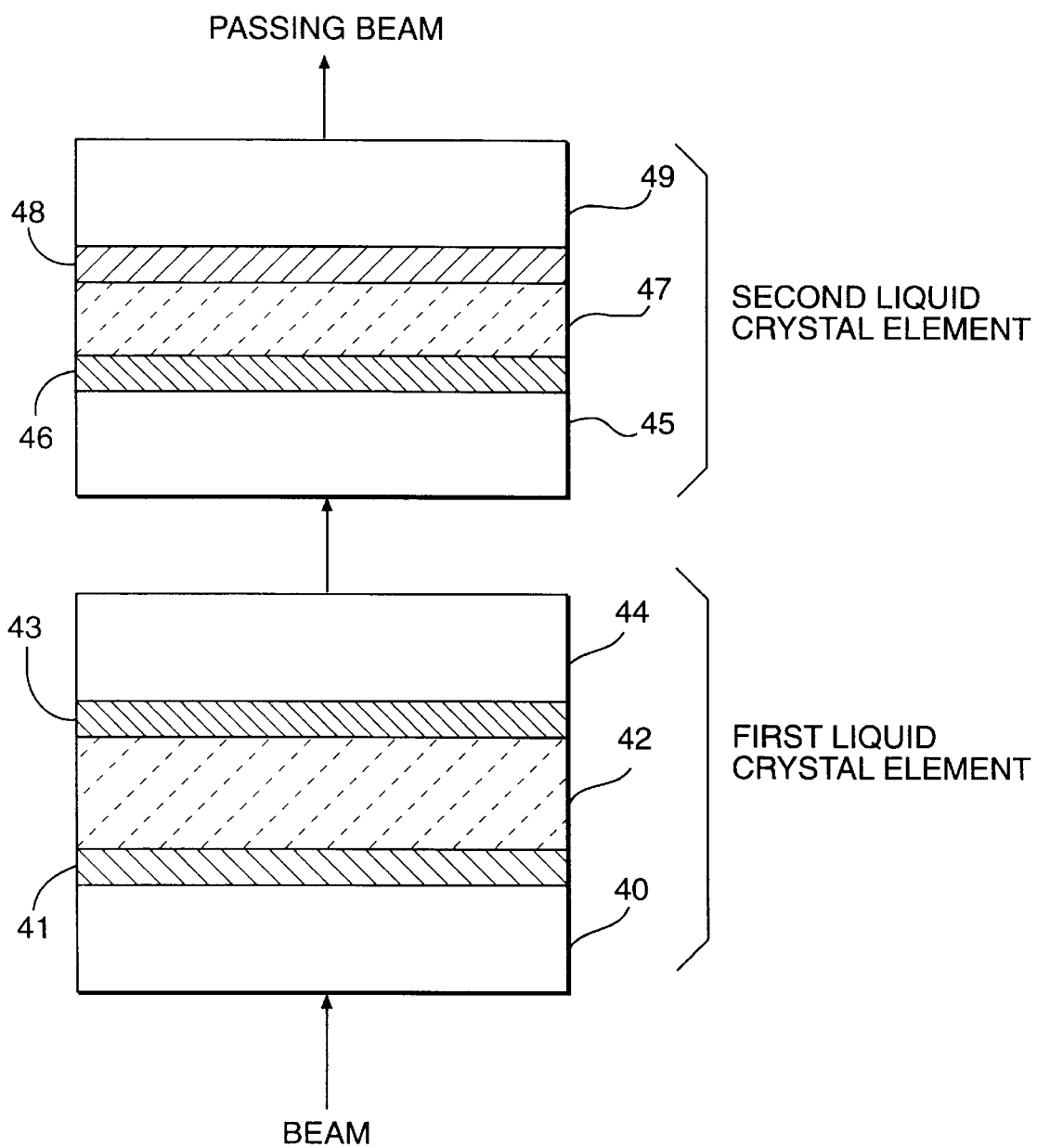
FIG. 5 is a diagram showing the structure of the liquid crystal element according to another embodiment of the present invention.

Referring to FIG. 5, the first liquid crystal element includes a glass substrate 40, a radial direction transparent electrode 41 to which a control voltage is applied for correcting wave front aberration caused by the tilt-angle in the radial direction of the optical disc 5, a liquid crystal layer 42 including nematic liquid crystal or similar material having double refraction, a transparent electrode 43 connected to ground level (i.e., 0V) pairing with the radial direction transparent electrode 41, and a glass substrate 44. The second liquid crystal element similarly includes a glass substrate 45, a tangential direction transparent electrode 46 to which a control voltage is applied for correcting wave front aberration caused by the tilt-angle in the tangential direction of the optical disc 5, a liquid crystal layer 47 including nematic liquid crystal or similar material having double refraction, a transparent electrode 48 connected to ground level (i.e., 0V) pairing with the tangential direction transparent electrode 46, and a glass substrate 49.

The laser beam from the light source (the semiconductor laser 1 as shown in FIG. 1) is made incident upon the glass substrate 40 and passes through the first liquid crystal element 42 and then passes through the second liquid crystal element 47 and finally exits the glass substrate 49. While passing through the respective layers the laser beam is imparted with a phase difference for correcting wave front aberration in the radial direction upon passing through the first liquid crystal element 42. The laser beam is then imparted with a phase difference for correcting wave front aberration in the tangential direction upon passing through the second liquid crystal element 47.

Therefore, when the laser beam passes through the first and second liquid crystal elements it is imparted with a phase difference with respect to the tilt-angles in the radial direction and tangential direction, so that the wave front aberration is corrected.

The dividing configuration of each of the transparent electrodes in the radial direction, the tangential direction, the liquid crystal driving method, and the like are the same as shown in FIG. 2.

For miniaturization and a reduction in the weight of the optical pickup 13 it is advantageous to integrate the liquid crystal elements in the radial direction and tangential direction as shown in FIG. 2. By applying the integrated structure, as shown in FIG. 2, a glass substrate can be omitted, thereby further reducing the weight and size of the optical pickup.

The single glass substrate used in the liquid crystal element, as shown in FIGS. 2 and 5, according to the present embodiment is about 1 mm in thickness. If the liquid crystal elements are used separately for the radial direction and tangential direction, four glass substrates are required, i.e., 40, 44, 45, and 49 as shown in FIG. 5. Therefore, the thickness of two liquid crystal elements is at least 4 mm. However, by using the integrated structure of the liquid crystal element, as shown in FIG. 2, the number of required glass substrates is reduced to three, i.e., 30, 34, and 36, so that the thickness of the liquid crystal element becomes at least 3 mm (the thickness of the liquid crystal layer itself is approximately a few $\mu$ m and the transparent electrode is much thinner than the glass substrate).

By using the separate transparent electrodes for the radial direction and tangential direction to apply a control voltage to the liquid crystal for correcting wave front aberration due to the tilt-angle, the necessity of increasing the number of divisions of the transparent electrode is diminished so that production of the transparent electrode is facilitated. Furthermore, calculation of the voltage to be applied to each of the divisions does not become complicated and the control method is simplified.

As described above, according to the present invention, the wave front aberration caused by the tilt-angle of the information recording medium can be corrected by a simple control means.

It will be apparent to those skilled in the art that various modifications and variations can be made in the aberration correcting apparatus and information recording medium play-back apparatus of the present invention without departing from the spirit or scope of the invention. Thus, it is intended that the present invention cover the modifications and variations of this invention provided they come within the scope of the appended claims and their equivalents.

What is claimed is:

1. An aberration correcting apparatus for correcting an aberration of a laser beam that is emitted from a light source and focused onto an information recording medium by an optical system, the aberration correcting apparatus comprising:

detecting means for detecting a radial tilt-angle and a tangential tilt-angle of an information recording medium;

wave front aberration correcting means, aligned in an optical path between the light source and the information recording medium, the wave front aberration correcting means including a first layer and a second layer for correcting a wave front aberration of an incident laser beam by changing a refractive index of a first material in the first layer according to a first applied voltage corresponding to the radial tilt-angle, and by changing a refractive index of a second material in the second layer according to a second applied voltage corresponding to the tangential tilt-angle; and control means for controlling the wave front aberration correcting means in correspondence with an output of the detecting means.

2. The aberration correcting apparatus according to claim 1, wherein the wave front aberration correcting means is divided into portions in a predetermined configuration; and the control means controls voltages to be applied to each of the divided portions of the wave front aberration correcting means independently.

3. The aberration correcting apparatus according to claim 2, wherein the wave front aberration correcting means is divided into a configuration corresponding to a wavefront aberration distribution for correcting the wave front aberration of the incident laser beam due to the radial tilt-angle and the tangential tilt-angle of the information recording medium.

4. The aberration correcting apparatus according to claim 3, wherein the wave front aberration correcting means comprises a liquid crystal element.

5. The aberration correcting apparatus according to claim 2, wherein the wave front aberration correcting means comprises a liquid crystal element.

6. The aberration correcting apparatus according to claim 1, wherein the wave front aberration correcting means comprises a liquid crystal element.

7. An aberration correcting apparatus for correcting an aberration of a laser beam that is emitted from a light source and focused onto an information recording medium by an optical system, the aberration correcting apparatus comprising:

a first detector capable of detecting a radial tilt-angle of the information recording medium;

a second detector capable of detecting a tangential tilt-angle of the information recording medium;

a wave front aberration correcting unit, aligned in an optical path between the light source and the information recording medium, the wave front aberration correcting unit including a first layer, a second layer, a first set of electrodes for changing a refractive index of a first material in the first layer corresponding to a first applied voltage, and a second set of electrodes for changing a refractive index of a second material in the second layer corresponding to a second applied voltage to correct a wave front aberration of an incident laser beam; and a controller capable of controlling the wave front aberration correcting unit by generating the first and second voltages in correspondence with outputs of the first and second detectors, respectively.

8. The aberration correcting apparatus according to claim 7, wherein the wave front aberration correcting unit is divided into portions in a predetermined configuration; and the controller controls voltages to be applied to each of the divided portions of the wave front aberration correcting unit independently.

9. The aberration correcting apparatus according to claim 8, wherein the wave front aberration correcting unit is divided into a configuration corresponding to a wavefront aberration distribution for correcting the wave front aberration of the incident laser beam due to the radial tilt-angle and the tangential tilt-angle of the information recording medium.

10. The aberration correcting apparatus according to claim 9, wherein the wave front aberration correcting unit comprises a liquid crystal element.

11. The aberration correcting apparatus according to claim 8, wherein the wave front aberration correcting unit comprises a liquid crystal element.

12. The aberration correcting apparatus according to claim 7, wherein the wave front aberration correcting unit comprises a liquid crystal element.

13. An aberration correcting apparatus for correcting an aberration of a laser beam that is emitted from a light source and focused on an information recording medium by an optical system, the aberration correcting apparatus comprising:

first and second liquid crystal elements aligned in an optical path between a light source and the information recording medium for correcting wave front aberration of an incident laser beam;

first detecting means for detecting a tilt-angle of the information recording medium in a radial direction;

second detecting means for detecting a tilt-angle of the information recording medium in a tangential direction; and liquid crystal element control means for outputting a first control voltage for correcting an aberration due to the tilt-angle in the radial direction and a second control voltage for correcting an aberration due to the tilt-angle in the tangential direction according to outputs of the first and second detecting means, wherein the first liquid crystal element includes a first electrode pair for applying the first control voltage and the second liquid crystal element includes a second electrode pair for applying the second control voltage.

14. The aberration correcting apparatus according to claim 13, wherein the first and second pairs of electrodes are divided in a predetermined configuration, respectively, and the liquid crystal control means controls voltages to be applied to the first and second pairs of electrodes independently.

15. The aberration correcting apparatus according to claim 14, wherein the wave front aberration correcting means is divided into two configurations corresponding to wavefront aberration distributions for correcting the wave front aberration of the incident laser beam due to the radial tilt-angle and the tangential tilt-angle of the information recording medium.

16. The aberration correcting apparatus according to claim 13, wherein the first and second electrode pairs are divided in substantially identical configurations and aligned on the liquid crystal elements at 90° relative to each other.

17. The aberration correcting apparatus according to claim 13, wherein the first liquid crystal element contains a first liquid crystal layer for correcting an aberration caused by a tilt-angle in the radial direction and the second liquid crystal element contains a second liquid crystal layer for correcting an aberration caused by a tilt-angle in the tangential direction, the second liquid crystal layer having a thickness smaller than that of the first liquid crystal layer.

18. An information recording medium play-back apparatus comprising:

a light source;

an optical system for focusing a beam emitted from the light source to an information recording medium;

play-back means for reproducing information by detecting reflected light from the information recording medium;

wave front aberration correcting means disposed in an optical path between the light source and the information recording medium, the wave front aberration correcting means including a first layer and a second layer for correcting wave front aberration of an incident light beam by changing a refractive index of a first material in the first layer and a second material in the second layer depending on a first and second applied voltage;

detecting means for detecting a tilt-angle of the information recording medium; and control means for controlling the wave front aberration correcting means based on an output of the detecting means.

19. The information recording medium play-back apparatus according to claim 18, wherein the wave front aberration correcting means is divided into portions in a predetermined configuration and the control means controls voltages to be applied to each of the divided portions of the wave front aberration correcting means independently.

20. The information recording medium play-back apparatus according to claim 19, wherein the wave front aberration correcting means is divided in a configuration corresponding to aberration distribution caused on the information recording medium.

21. The information recording medium play-back apparatus according to claim 18, wherein the wave front aberration correcting means is a liquid crystal element.

22. An apparatus for correcting wave front aberration during playback of an optical disc, comprising:

a first transparent electrode, to which a first control voltage is applied to correct wave front aberration due to tilt angle of an optical disc in a first direction;

a first liquid crystal layer, which adjusts a phase difference to be imparted to a passing laser beam by changing a refractive index of the first liquid crystal layer according to the first control voltage applied to the first transparent electrode;

a second transparent electrode, to which a second control voltage is applied to correct wave front aberration due to tilt angle of an optical disc in a second direction; and a second liquid crystal layer, which adjusts a phase difference to be imparted to a passing laser beam by changing a refractive index of the second liquid crystal layer according to the second control voltage applied to the second transparent electrode.

23. The apparatus according to claim 22, wherein the first and second transparent electrodes are oriented ninety degrees relative to each other.

24. The apparatus according to claim 22, wherein the first and second liquid crystal layers are integrated.

* * * * *